(12) United States Patent
Larsson et al.

(10) Patent No.: US 11,148,498 B2
(45) Date of Patent: Oct. 19, 2021

(54) METHOD FOR CONTROLLING WHEEL AXLE SUSPENSION OF A VEHICLE

(71) Applicant: Volvo Truck Corporation, Gothenburg (SE)

(72) Inventors: Lena Larsson, Västra Frölunda (SE); Emil Pettersson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 332 days.

(21) Appl. No.: 16/464,623

(22) PCT Filed: Nov. 29, 2016

(86) PCT No.: PCT/EP2016/079163
§ 371 (c)(1),
(2) Date: May 28, 2019

(87) PCT Pub. No.: WO2018/099540
PCT Pub. Date: Jun. 7, 2018

(65) Prior Publication Data
US 2020/0122541 A1    Apr. 23, 2020

(51) Int. Cl.
*B60G 17/016* (2006.01)
*B60G 11/27* (2006.01)

(52) U.S. Cl.
CPC .......... *B60G 17/0164* (2013.01); *B60G 11/27* (2013.01); *B60G 2200/466* (2013.01);
(Continued)

(58) Field of Classification Search
CPC ............... B60G 17/0164; B60G 11/27; B60G 2200/466; B60G 2202/152;
(Continued)

(56) References Cited

U.S. PATENT DOCUMENTS 3,491,845 A    1/1970  Allison
5,109,815 A *  5/1992  Maeda .................. G05D 19/02
                                                    123/192.1
(Continued)

FOREIGN PATENT DOCUMENTS

KR      20180053911 A  *  5/2018
WO      WO-9967113 A1  *  12/1999  .......... B60T 8/17554
WO      02074593 A1      9/2002

OTHER PUBLICATIONS

International Search Report and Written Opinion for International Patent Application No. PCT/EP2016/079163, dated Aug. 24, 2017, 12 pages.

*Primary Examiner* — James A English
*Assistant Examiner* — Kurtis Nielson
(74) *Attorney, Agent, or Firm* — Withrow & Terranova, PLLC

(57) ABSTRACT

The present invention relates to a method for controlling wheel axle suspension of a vehicle (100), said vehicle (100) comprising a vehicle chassis (116), a prime mover (122) for propulsion of said vehicle (100), said prime mover (122) being connected to the vehicle chassis (116); and a front wheel axle (132) comprising an individually adjustable wheel axle suspension arrangement (104, 106) on a respective left and right hand side of the front wheel axle (132) as seen in the longitudinal direction of the vehicle (100), said individually adjustable wheel axle suspension arrangement (104, 106) being connected between the front wheel axle (132) and the vehicle chassis (116); the method being comprising the steps of: determining (S1) an output torque from said prime mover (122); determining (S2) a rotation (302) of said vehicle chassis (116) caused by the determined output torque from the prime mover (122); comparing (S3) said rotation (302) with a predetermined threshold limit; and controlling (S4) the individually adjustable wheel axle sus- (Continued)

pension arrangement (104, 106) on at least one of the left and right hand sides of the front wheel axle (132) such that the rotation (302) of said vehicle chassis (116) is below said predetermined threshold limit.

14 Claims, 4 Drawing Sheets

(52) U.S. Cl.
CPC .... *B60G 2202/152* (2013.01); *B60G 2401/11* (2013.01); *B60G 2500/206* (2013.01); *B60G 2600/1877* (2013.01); *B60G 2800/18* (2013.01); *B60G 2800/91* (2013.01)

(58) Field of Classification Search
CPC .......... B60G 2401/11; B60G 2500/206; B60G 2600/1877; B60G 2800/18; B60G 2800/91; B60G 2300/0262; B60G 2400/0511; B60G 2400/32; B60G 2800/01
See application file for complete search history.

(56) References Cited

U.S. PATENT DOCUMENTS

| | | | | |
|---|---|---|---|---|
| 5,163,702 | A * | 11/1992 | Wood | B60G 17/0164 280/5.513 |
| 5,785,344 | A * | 7/1998 | Vandewal | B60G 17/0152 267/64.16 |
| 5,785,345 | A * | 7/1998 | Barias | B60G 11/465 280/124.116 |
| 6,015,155 | A | 1/2000 | Brookes et al. | |
| 7,051,851 | B2 * | 5/2006 | Svartz | B60G 9/00 188/300 |
| 2003/0055549 | A1 * | 3/2003 | Barta | B60W 10/184 701/70 |
| 2004/0064246 | A1 * | 4/2004 | Lu | B62D 6/002 701/124 |
| 2004/0084858 | A1 | 5/2004 | Svartz et al. | |
| 2004/0102894 | A1 * | 5/2004 | Holler | B60T 8/246 701/124 |
| 2004/0108663 | A1 | 6/2004 | Rickers | |
| 2012/0059544 | A1 * | 3/2012 | Kinoshita | B60W 20/15 701/22 |
| 2015/0046031 | A1 | 2/2015 | Gagliano et al. | |

* cited by examiner

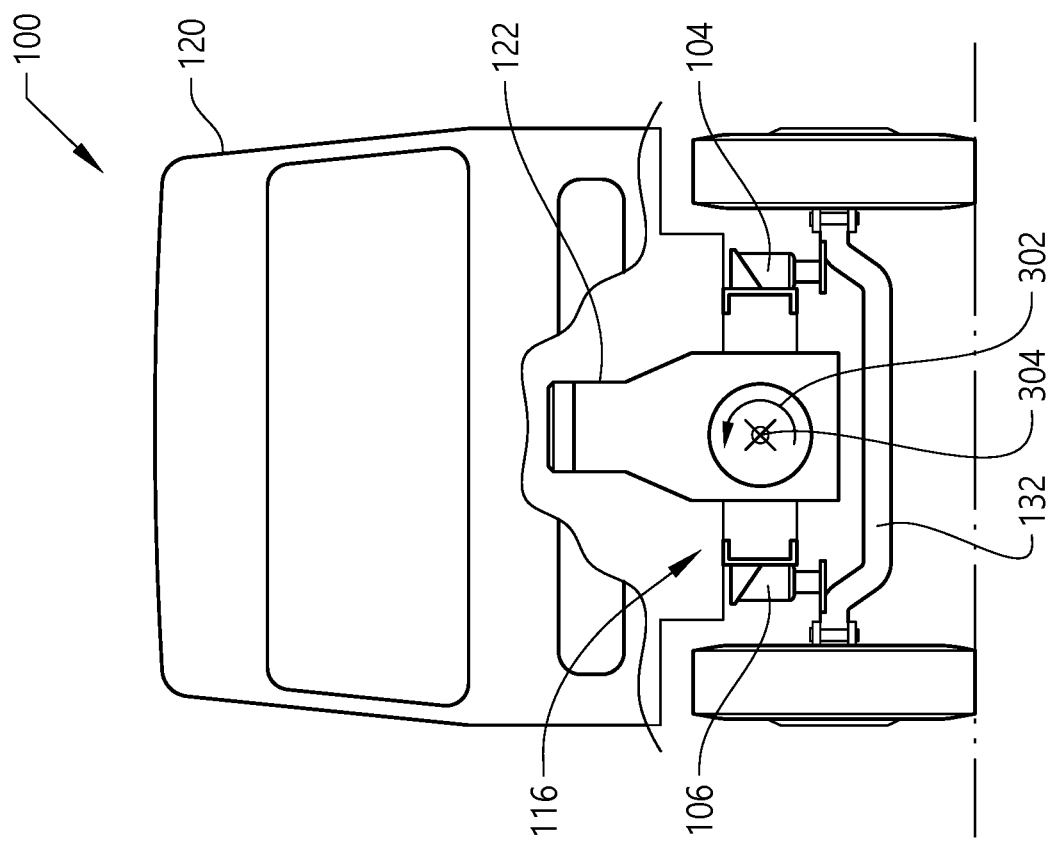
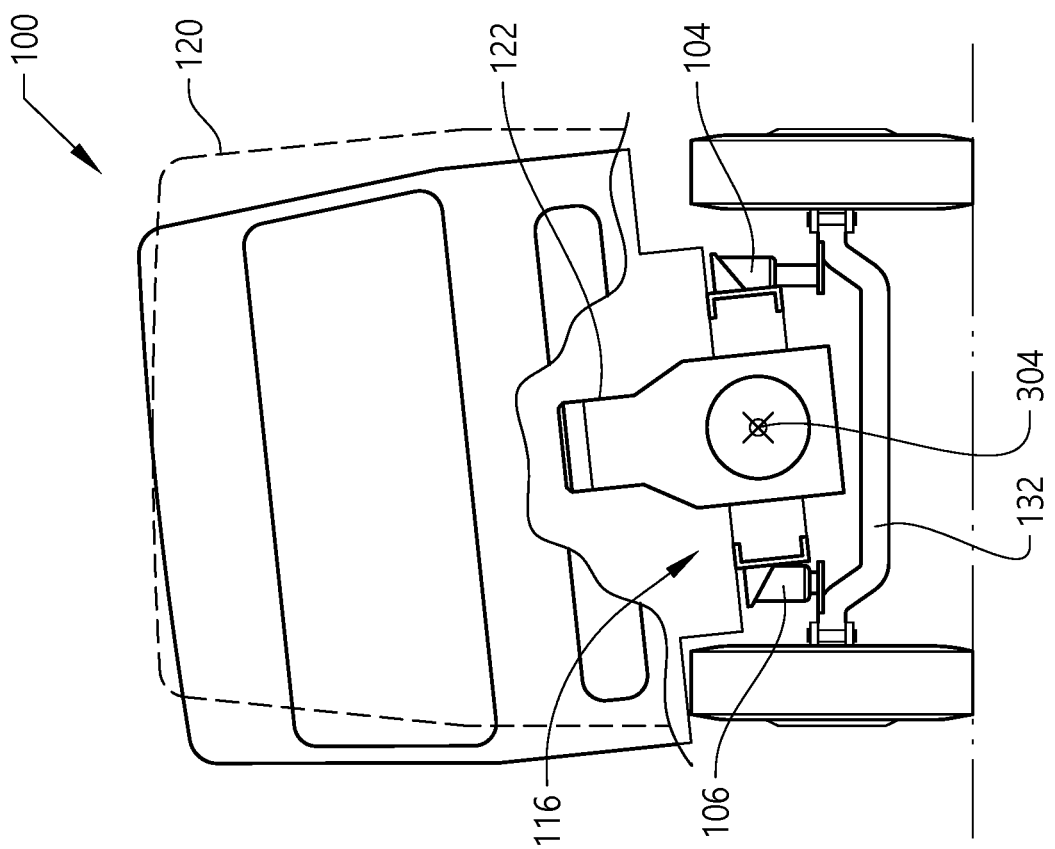

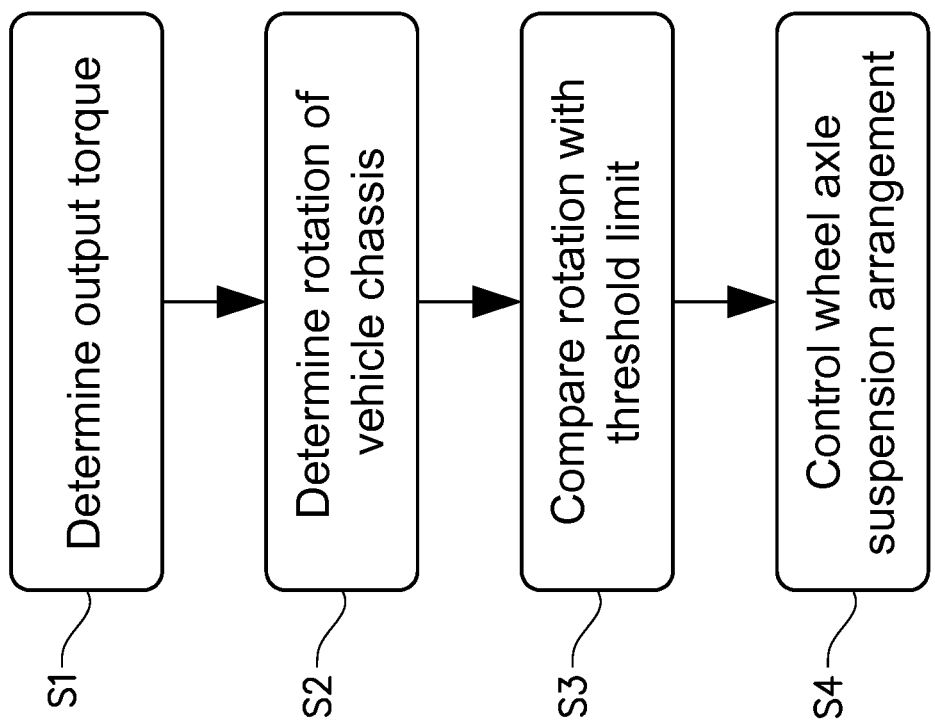

METHOD FOR CONTROLLING WHEEL AXLE SUSPENSION OF A VEHICLE

This application is a 35 USC 371 national phase filing of International Application No. PCT/EP2016/079163, filed Nov. 29, 2016, the disclosure of which is incorporated herein by reference in its entirety.

TECHNICAL FIELD

The present invention relates to a method for controlling wheel axle suspension of a vehicle. The invention also relates to a system for controlling wheel axle suspension of a vehicle, and a vehicle comprising such a system. The invention is applicable on vehicles, in particularly low, medium and heavy duty vehicles commonly referred to as trucks. Although the invention will mainly be described in relation to a truck, it may also be applicable for other type of vehicles such as e.g. buses, working machines, cars, etc.

BACKGROUND

In the field of heavy duty vehicles such as trucks, the demand on vehicle performance is steadily increasing and the vehicles are continuously developed in order to meet the demands from the market. Improved handling of the vehicle and an increased comfort are some of the criteria that become an important aspect for the owner of the vehicle.

There are some driving situations that create additional demand on the vehicle to fulfil at least the above described criteria. For example, when driving at slow speed in relatively steep uphill, it is important to provide sufficient contact pressure between the vehicle tires and the ground surface. This is important for e.g. the propelled wheels as well as the front, steerable wheels. If the contact pressure between the front wheels and the ground surface is too low, a reduced steerability is provided, and if the contact pressure between the propelled wheels and the ground surface is too low, the wheels will spin relative to the ground surface.

According to a further aspect, when acceleration from a low speed with high output torque from the engine, the chassis of the vehicle is also often exposed to an undesirable rotational motion. There is thus a desire to reduce this rotational motion of the vehicle, and in particular the vehicle chassis, during acceleration of the vehicle.

SUMMARY

It is an object of the present invention to provide a method which reduces rotation of the vehicle chassis. The object is at least partly achieved by a method according to claim 1.

According to a first aspect of the present invention, there is provided a method for controlling wheel axle suspension of a vehicle, the vehicle comprising a vehicle chassis, a prime mover for propulsion of the vehicle, the prime mover being connected to the vehicle chassis; and a front wheel axle comprising an individually adjustable wheel axle suspension arrangement on a respective left and right hand side of the front wheel axle as seen in the longitudinal direction of the vehicle, the individually adjustable wheel axle suspension arrangement being connected between the front wheel axle and the vehicle chassis; the method comprising the steps of determining an output torque from the prime mover; determining a rotation of the vehicle chassis caused by the determined output torque from the prime mover; comparing the rotation with a predetermined threshold limit; and controlling the individually adjustable wheel axle suspension arrangement on at least one of the left and right hand sides of the front wheel axle such that the rotation of the vehicle chassis is below the predetermined threshold limit.

The wording "rotation of the vehicle chassis" should be understood to mean a rotation around a geometric axis extending in the longitudinal direction of the vehicle. Such rotation causes one of the left and right hand sides of the chassis to be positioned closer to the ground surface in comparison to the other one of the left and right hand sides. Such rotation of the vehicle chassis may feel uncomfortable for the vehicle operator as also the vehicle cabin will rotate/bend accordingly. Moreover, the wording "chassis" should in the following and throughout the entire description be interpreted to also include the vehicle frame and vehicle cabin.

Furthermore, the wording "individually adjustable wheel axle suspension" should be interpreted as wheel suspensions which can be controlled individually for each wheel, i.e. individually on a respective left and right hand side of the wheel axle. Accordingly, the wheel suspension on the right hand side of the front wheel axle can be controlled independently of the wheel suspension on the left hand side of the same wheel axle. As will be described below, each of the individually adjustable wheel axle suspension may comprise a pneumatically controlled air bellows.

Also, the predetermined threshold limit should be understood as a value which can be set individually depending on the specific vehicle, or situation at which the vehicle is intending to operate. For example, some applications may require that the vehicle cabin is exposed to less rotation than for other applications, wherein the threshold limit is set lower for such applications.

An advantage of the present invention is that the vehicle chassis, including the vehicle cabin, will be kept substantially horizontal during acceleration of the vehicle. This is particularly advantageous during acceleration at low vehicle speed and high engine output torque, at which there is an increased risk of vehicle chassis rotation. Hereby, the comfort for the vehicle driver and other passengers in the vehicle cabin will be increased. Various alternatives of how to determine the output torque from the prime mover as well as determining the rotation of the vehicle chassis will be described in detail below.

According to an example embodiment, the method may further comprise the steps of determining a moment of inertia of the vehicle chassis; and calculating a rotation of the vehicle chassis by means of the moment of inertia of the vehicle chassis and the determined output torque from the prime mover.

The moment of inertia is a tensor that determines the rotation of a body for a specific torque. Hereby, the method can be applicable for various types of vehicles having different moment of inertia, wherein the moment of inertia for the specific vehicle is given as an input parameter when calculating the rotation of the vehicle chassis. Such moment of inertia can be implemented in computer software for the respective vehicle.

According to an example embodiment, the vehicle may comprise a propeller shaft arranged between the prime mover and a rear wheel axle of the vehicle, wherein the step of determining the output torque of the prime mover is executed by determining an output torque on the propeller shaft.

The propeller shaft is connected to a joint coupling connecting the propeller shaft to the driven wheel axle. As the prime mover is mechanically connected to the vehicle chassis, the torque on the propeller shaft will give rise to the rotation of the vehicle chassis. Hence, determining the output torque on the propeller shaft is advantageous as it gives a good indication of how much the vehicle chassis will rotate.

According to an example embodiment, the output torque on the propeller shaft may be determined by means of receiving a signal from a torque sensor connected to the propeller shaft.

Hereby, a direct value of the output torque on the propeller shaft is given.

According to an example embodiment, the vehicle may further comprise a gearbox arranged between the prime mover and the propeller shaft, wherein the output torque on the propeller shaft is determined by means of receiving a signal indicative of a rotational speed of the prime mover and a current gear ratio between an input shaft and an output shaft of the gearbox.

An advantage is that a sensor or the like arranged on the propeller shaft is no longer needed. Also, by receiving a signal indicative of the specific gear in use, the output torque on the propeller shaft may be predicted in advance by determining an upcoming rotational speed of the prime mover. Hereby, the individually adjustable wheel axle suspension arrangement may be controlled in advance or be prepared to be controlled at the direct instance when the vehicle reaches the predicted rotational speed of the prime mover. Thus, an improved response time for the system is achieved.

According to an example embodiment, each of the individually adjustable wheel axle suspension arrangements of the front wheel axle may be connected to a respective portion of the vehicle chassis, wherein the individually adjustable wheel axle suspension arrangement is controlled such that the portions of the vehicle chassis are positioned at a substantially same vertical level relative to the front wheel axle.

Hereby, a sensor or the like arranged in connection with the respective portions of the vehicle chassis, at the position where the suspension arrangement connects to the chassis, may determine/measure a vertical distance between the respective portions and the front wheel axle. Hereby, the individually adjustable wheel axle suspension arrangement may be controlled by receiving signals from the respective sensors with information relates to the vertical distance to the front wheel axle.

According to an example embodiment, each of the individually adjustable wheel axle suspension arrangements may comprise a pneumatically controlled air bellows, wherein the step of controlling the individually adjustable wheel axle suspension arrangement on at least one of the left and right hand sides of the front wheel axle is executed by increasing or decreasing an air pressure level of at least one of the pneumatically controlled air bellows.

According to an example embodiment, the vehicle may further comprise a first and a second rear wheel axle, the first rear wheel axle being position in front of the second rear wheel axle, the method further comprising the steps of determining a wheel axle load on the front wheel axle; comparing the wheel axle load with a predetermined minimum threshold limit; and increasing the wheel axle load on the second rear wheel axle if the wheel axle load on the front wheel axle is below the predetermined threshold limit.

Hereby, it is assured that a sufficient wheel axle load pressure is provided on the front wheel axle. This will keep sufficient steerability for the front wheel axle, i.e. the steerable wheel axle. The wording "in front of" should be understood to be in relation to the longitudinal direction of the vehicle.

According to an example, also the front wheel axle may be arranged as a propelled wheel axle. Hereby, if the determined wheel axle load is sufficiently high, or too high, the wheel axle load on the second rear wheel axle may be increased. Hereby, it is possible to improve the load distribution on the different wheel axles of the vehicle.

According to an example embodiment, an individually adjustable wheel axle suspension arrangement may be connected between the first rear wheel axle and the vehicle chassis, wherein the step of increasing the wheel axle load on the second rear wheel axle is executed by reducing a load pressure of the individually adjustable suspension arrangement of the first rear wheel axle.

According to an example embodiment, the individually adjustable suspension arrangement connected to the first rear wheel axle may comprise a pneumatically controlled air bellows, wherein the step of increasing the wheel axle load on the second wheel axle is executed by reducing an air pressure level of the pneumatically controlled air bellows.

According to an example embodiment, the first rear wheel axle may be a liftable wheel axle, wherein the step of increasing the wheel axle load on the second wheel axle is executed by lifting the first rear wheel axle.

When controlling the load pressure on the front wheel axle to be above the predetermined threshold limit, it may also be desirable to control the load pressure on the propelled rear wheel axle such that it is above a certain threshold limit in order to maintain sufficient traction between the wheels thereof and the ground surface. Accordingly, the method may also comprise the step of receiving a signal indicative of a wheel axle load on the propelled rear wheel axle, and controlling the individually adjustable wheel axle suspension arrangement of the non-propelled rear wheel axle such that the wheel axle load on the propelled rear wheel axle is above a predetermined threshold limit.

According to a second aspect of the present invention, there is provided a system for controlling wheel axle suspension of a vehicle, the vehicle comprising a vehicle chassis, a prime mover for propulsion of the vehicle, the prime mover being connected to the vehicle chassis; and a front wheel axle comprising an individually adjustable wheel axle suspension arrangement on a respective left and right hand side of the front wheel axle as seen in the longitudinal direction of the vehicle, the individually adjustable wheel axle suspension arrangement being connected between the front wheel axle and the vehicle chassis; wherein the system comprises a control unit configured to control the system to determine an output torque from the prime mover; determine a rotation of the vehicle chassis caused by the determined output torque from the prime mover; compare the rotation with a predetermined threshold limit; and control the individually adjustable wheel axle suspension arrangement on at least one of the left and right hand sides of the front wheel axle such that the rotation of the vehicle chassis is below the predetermined threshold limit.

Effects and features of the second aspect of the present invention are largely analogous to those described above in relation to the first aspect.

According to a third aspect of the present invention, there is provided a vehicle comprising a vehicle chassis, a prime mover for propulsion of the vehicle, wherein the prime mover is connected to the vehicle chassis, a front wheel axle comprising an individually adjustable wheel axle suspension arrangement on a respective left and right hand side of the front wheel axle as seen in the longitudinal direction of the vehicle, the individually adjustable wheel axle suspension arrangement being connected between the front wheel axle and the vehicle chassis, wherein the vehicle further comprises a system described above in relation to the second aspect.

Effects and features of the third aspect of the present invention are largely analogous to those described above in relation to the first aspect.

According to a fourth aspect of the present invention, there is provided a computer program comprising program code means for performing any of the steps described above in relation to the first aspect when the program is run on a computer.

According to a fifth aspect of the present invention, there is provided a computer readable medium carrying a computer program comprising program means for performing the any of the steps described above in relation to the first aspect when the program means is run on a computer.

Effects and features of the fourth and fifth aspects of the present invention are largely analogous to those described above in relation to the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIGS. 3a-3b are front views of the vehicle in FIG. 1 during acceleration thereof; and FIG. 4 is an example embodiment of a flow chart of a method for controlling wheel axle suspension of the vehicle in FIG. 1.

DETAILED DESCRIPTION OF EXAMPLE EMBODIMENTS OF THE INVENTION

Figure 1:
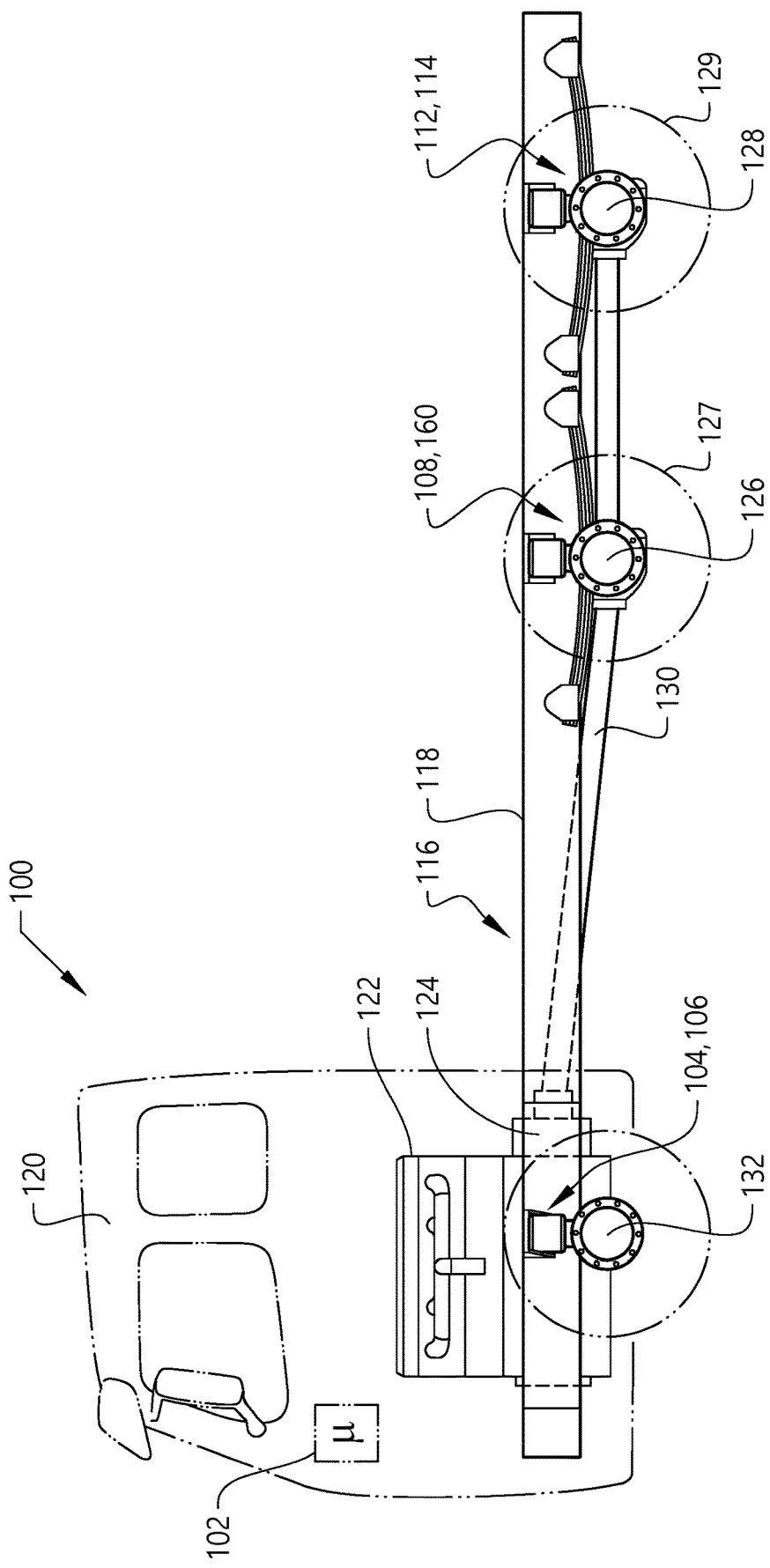
FIG. 1 is a side view of a heavy duty vehicle, in the form of a truck according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 100 arranged to be provided with a control unit 102 having computer program stored therein for controlling wheel axle suspension arrangement(s) of the vehicle 100. As depicted in FIG. 1, the vehicle 100 comprises a vehicle chassis 116 which in turn comprises a vehicle frame 118 and a vehicle cabin 120. Furthermore, the vehicle 100 comprises a prime mover 122, preferably in the form of an internal combustion engine. The prime mover 122 is connected to a gearbox 124 which in turn is connected to a first 126 and a second 128 rear wheel axle by means of a propeller shaft 130 and a rear propeller shaft 131. The propeller shaft 130 is connected to the first rear wheel axle 126 by means of a first joint coupling (see 202 in FIG. 2). The rear propeller shaft 131 is arranged between the first joint coupling 202 and a second joint coupling (204 in FIG. 2) for connection to the second 128 rear wheel axle. The first 126 and second 128 rear wheel axles are each provided with wheels 127, 129 on a respective left and right hand side of the vehicle 100 as seen in the longitudinal direction thereof. Although the gearbox 124 is depicted as positioned between the prime mover 122 and the propeller shaft 130, it may also be positioned further downstream the propeller shaft 130, such as between the first joint coupling (202 in FIG. 2) and the rear propeller shaft 131.

Moreover, the vehicle 100 comprises a front wheel axle 132, which front wheel axle 132 is a steerable wheel axle. Furthermore, the vehicle 100 comprises wheel axle suspension arrangements 104, 106, 108, 110, 112, 114 for connecting the respective front wheel axle 132, the first rear wheel axle 126 and the second rear wheel axle 128 to the vehicle chassis 116. In the following, the wheel axle suspension arrangements 104, 106 connected to the front wheel axle 132 will be referred to as the front wheel axle suspension arrangement 104, 106, the wheel axle suspension arrangements 108, 110 connected to the first rear wheel axle 126 will be referred to as the first rear wheel axle suspension arrangement 108, 110, and the wheel axle suspension arrangements 112, 114 connected to the second rear wheel axle 128 will be referred to as the second rear wheel axle suspension arrangement 112, 114. These wheel axle suspension arrangements and their connection to the chassis 116 and the respective wheel axles will be described in further detail below in relation to the description of FIG. 2.

Figure 2:
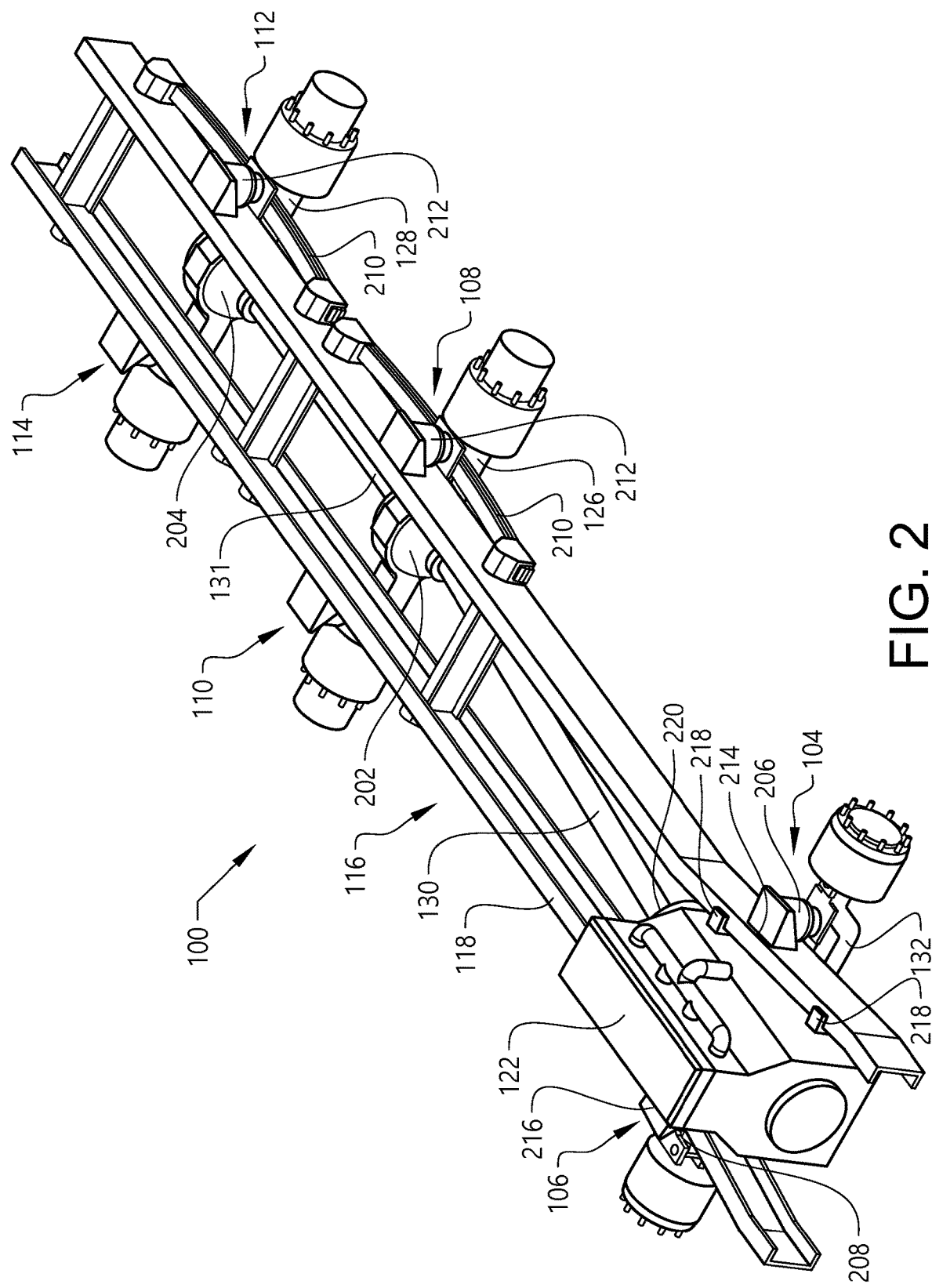
FIG. 2 is a perspective view illustrating in detail an example embodiment of portions of the vehicle chassis and suspension arrangements of the vehicle in FIG. 1.

Turning now to FIG. 2, which is a perspective view illustrating in detail an example embodiment of the vehicle chassis 118 and suspension arrangements 104, 106, 108, 110, 112, 114 of the vehicle in FIG. 1. For simplicity of illustration, the wheels and vehicle cabin have been omitted from FIG. 2.

As described above, the vehicle 100 comprises a front wheel axle suspension arrangement 104, 106 connected between the front wheel axle 132 and the vehicle chassis 116 on a respective left and right hand side of the front wheel axle 132. The front wheel axle suspension arrangement 104, 106 are each individually adjustable wheel axle suspension arrangements which mean that they can be controlled independently of the remaining wheel axle suspension arrangements of the vehicle 100. In detail, the front wheel axle suspension arrangement 104 on the left hand side of the front wheel axle 132 can be controlled individually in relation to the front wheel axle suspension arrangement 106 on the right hand side of the front wheel axle 132, and vice versa. The front wheel axle suspension arrangement 104 on the left hand side of the front wheel axle 132 can, for example, be raised while keeping the front wheel axle suspension arrangement 106 on the right hand side stationary.

Moreover, the front wheel axle suspension arrangement 104, 106 comprises a pneumatically controlled air bellows 206, 208 on the respective left and right hand sides of the front wheel axle 132. Hereby, compressed air or other pneumatic medium is provided into the respective air bellows 206, 208 when there is a desire to raise the vehicle chassis 116 relative to the front wheel axle 132, and air is provided out from the respective air bellows 206, 208 when there is a desire to lower the vehicle chassis 116 relative to the front wheel axle 132.

As further illustrated in FIG. 2, the front wheel axle suspension arrangements 104, 106 are connected to the vehicle chassis 216 at a respective portion 214, 216 thereof. In more detail, the front wheel axle suspension arrangement 104 on the left hand side of the front wheel axle 132 is connected to the vehicle frame 118 at a left frame portion 214, while the front wheel axle suspension arrangement 106 on the right hand side of the front wheel axle 132 is connected to the vehicle frame 118 at a right frame portion 216.

Furthermore, the vehicle 100 comprises first rear wheel axle suspension arrangements 108, 110 connected between the first rear wheel axle 126 and the vehicle chassis 116, and second rear wheel axle suspension arrangements 112, 114 connected between the second rear wheel axle 128 and the vehicle chassis 116. The first 108, 110 and second 112, 114 rear wheel axle suspension arrangements are each preferably individually adjustable wheel axle suspension arrangements.

It should thus be readily understood that each of the first 108, 110 and second 112, 114 rear wheel axle suspension arrangements are individually adjustable according to the same principle as described above in relation to the front wheel axle suspension arrangement 104, 106. The first rear wheel axle suspension arrangement 110 on the right hand side of the first rear wheel axle 126 can, for example, be controlled individually in relation to the remaining wheel axle suspension arrangements of the vehicle 100.

As is further depicted in FIG. 2, each of the first 108, 110 and second 112, 114 rear wheel axle suspension arrangements comprises a respective leaf spring arrangement 210 and a pneumatically controlled air bellows 212. It should however be readily understood that other suspension arrangements for the first 108, 110 and second 112, 114 rear wheel axle suspension arrangements are also conceivable and within the scope of the present invention. For example, the first 108, 110 and second 112, 114 rear wheel axle suspension arrangements may comprise only pneumatically controlled air bellows 212, i.e. the leaf springs are omitted. Also, the first 108, 110 and second 112, 114 rear wheel axle suspension arrangements may comprise a hydraulically controlled suspension arrangement, or a combination of hydraulically and pneumatically controlled suspension arrangements, or a hydraulically controlled suspension arrangement in combination with the leaf spring arrangement 210.

Furthermore, the first rear wheel axle 126 is arranged to be liftable. Hereby, during traveling, the first rear wheel axle 126 can be lifted such that no contact is present between the wheels 127 on the first rear wheel axle 126 and the ground surface. By lifting the first rear wheel axle 126, the wheel axle load on the front wheel axle 132 can be increased for improving the steerability of the vehicle 100, especially during acceleration thereof. The wheel axle load on the front wheel axle 132 can also be increased by reducing the wheel axle load on the first rear wheel axle 126 by controlling the first rear wheel axle suspension arrangements 108, 110. The second rear wheel axle 128 may also be liftable.

Still further, the prime mover 122 is also connected to the vehicle chassis 116. This is in FIG. 2 illustrated by means of a plurality of attachment portions 218. Also, although the vehicle cabin 120 is excluded from the illustration in FIG. 2, it should be readily understood that also the vehicle cabin 120 is connected to the vehicle chassis 116.

Reference is therefore made to FIGS. 3a and 3b in combination with the illustration in FIG. 2, in order to describe the method for controlling the wheel axle suspension of the vehicle 100 in further detail. FIGS. 3a-3b are illustrating the general principle of the present invention. In detail, the continuous lines in FIG. 3a illustrates the effects of the vehicle 100 without the use of the inventive method and system of the present description, while the dashed lines, and FIG. 3b, illustrate the vehicle 100 when accelerating with high output torque on the propeller shaft 130 with the use of the inventive method.

As described above, the prime mover 122 is connected to the vehicle chassis by means of the plurality of attachment portions 218, and the propeller shaft 130 is connected to the first wheel axle 126. Therefore, when driving at relatively slow speed and accelerating the vehicle 100 with a high output torque from the prime mover 122, the vehicle chassis 116 will be exposed to a torque which will create a rotation 302 of the vehicle chassis 116 around a geometric axis 304 extending in the longitudinal direction of the vehicle 100. This is thus caused by the rotation and torque on the propeller shaft 130 which provides a rotation on the prime mover 122 and also the vehicle chassis 116, to which the prime mover 122 is fixedly connected.

Accordingly, the rotation 302 of the vehicle chassis 116 may be proportional to the output torque from the prime mover 122 and in particular to the output torque on the propeller shaft 130. The specific amount of the rotation also depends on the specific vehicle 100 with regards to e.g. its weight, structural stiffness, moment of inertia, etc. The moment of inertia for the vehicle can preferably be set as an indicative parameter determining the rotation of the vehicle chassis 116 for a given output torque on the propeller shaft 130. As clearly depicted in FIG. 3a, at high output torques on the propeller shaft 130, the front wheel axle suspension arrangement 106 on the right hand side of the front wheel axle 132 is compressed while the front wheel axle suspension arrangement 104 on the left hand side of the front wheel axle 132 is expanded.

By means of the present invention, when determining the output torque from the prime mover 122 the rotation 302 of the vehicle chassis 116 can be determined. Thereafter the front wheel axle suspension arrangements 104, 106 on the left and right hand side of the front wheel axle 132 can be controlled such that the vehicle chassis 116 will be substantially parallel relative to the front wheel axle 132 as depicted in FIG. 3b. According to the example depicted in FIG. 3b, compressed air is provided to the air bellows 216 of the front wheel axle suspension arrangement 106 on the right hand side, while the air bellows 214 on the front wheel axle suspension arrangement 104 on the left hand side is relieved from air.

When adjusting for the rotation 302 caused by the output torque on the propeller shaft 130 also the first 108, 110 and second 112, 114 rear wheel axle suspension arrangements may be controlled and adjusted according to similar principles as the front wheel axle suspension arrangements 104, 106.

Finally, in order to sum up, reference is made to FIG. 4 which illustrates an example embodiment of a flow chart of a method for controlling wheel axle suspension of the vehicle 100 described above in relation to FIGS. 1-3b.

Firstly, during operation of the vehicle, the output torque from the prime mover 122 is determined S1. Preferably, the output torque on the propeller shaft 130 is determined. The output torque on the propeller shaft 130 may be determined by receiving a signal from a torque sensor 220 positioned on the propeller shaft 130. The output torque may also be determined by receiving a signal indicative of a present, or upcoming predicted rotational speed of the prime mover 122, which in combination with a gear ratio for a current gear stage of the gearbox 124 can be used for calculating the output torque. A rotation 302 of the vehicle chassis 116 is thereafter determined S2. The determined rotation 302 is compared S3 with a predetermined threshold limit. Hereby, it can be determined if the rotation 302 is too severe and adjustment is needed. If the rotation 302 is determined to be above the predetermined threshold limit, i.e. too severe, the individually adjustable wheel axle suspension arrangement 104, 106 on at least one of the left and right hand sides of the front wheel axle 132 is controlled S4 such that the rotation 302 of the vehicle chassis 116 will be below the predetermined threshold limit.

It is to be understood that the present invention is not limited to the embodiments described above and illustrated in the drawings; rather, the skilled person will recognize that many changes and modifications may be made within the scope of the appended claims. The invention should not be limited to vehicle comprising three wheel axles as depicted in the figures. The invention is equally applicable for vehicles comprising e.g. four or five wheel axles, etc.

The invention claimed is:

1. A method for controlling wheel axle suspension of a vehicle, the vehicle comprising a vehicle chassis, a prime mover for propulsion of the vehicle, the prime mover being connected to the vehicle chassis; and a front wheel axle comprising an individually adjustable wheel axle suspension arrangement on a respective left and right hand side of the front wheel axle as seen in the longitudinal direction of the vehicle, the individually adjustable wheel axle suspension arrangement being connected between the front wheel axle and the vehicle chassis; the method comprising:
   determining an output torque from the prime mover;
   determining a rotation of the vehicle chassis caused by the determined output torque from the prime mover;
   comparing the rotation with a predetermined threshold limit; and
   controlling the individually adjustable wheel axle suspension arrangement on at least one of the left and right hand sides of the front wheel axle such that the rotation of the vehicle chassis is below the predetermined threshold limit.

2. The method of claim 1, comprising:
   determining a moment of inertia of the vehicle chassis; and
   calculating the rotation of the vehicle chassis by the moment of inertia of the vehicle chassis and the determined output torque from the prime mover.

3. The method of claim 1, wherein the vehicle comprises a propeller shaft arranged between the prime mover and a rear wheel axle of the vehicle, wherein determining the output torque of the prime mover is executed by determining an output torque on the propeller shaft.

4. The method of claim 3, wherein the output torque on the propeller shaft is determined by receiving a signal from a torque sensor connected to the propeller shaft.

5. The method of claim 3, wherein the vehicle further comprises a gearbox arranged between the prime mover and the propeller shaft, wherein the output torque on the propeller shaft is determined by receiving a signal indicative of a rotational speed of the prime mover and a current gear ratio between an input shaft and an output shaft of the gearbox.

6. The method of claim 1, wherein each of the individually adjustable wheel axle suspension arrangements of the front wheel axle is connected to a respective portion of the vehicle chassis, wherein the individually adjustable wheel axle suspension arrangement is controlled such that the portions of the vehicle chassis are positioned at a substantially same vertical level relative to the front wheel axle.

7. The method of claim 1, wherein each of the individually adjustable wheel axle suspension arrangements comprises a pneumatically controlled air bellows, wherein controlling the individually adjustable wheel axle suspension arrangement on at least one of the left and right hand sides of the front wheel axle is executed by increasing or decreasing an air pressure level of at least one of the pneumatically controlled air bellows.

8. The method of claim 1, wherein the vehicle further comprises a first and a second rear wheel axle, the first rear wheel axle being position in front of the second rear wheel axle, the method further comprising:
   determining a wheel axle load on the front wheel axle;
   comparing the wheel axle load with a predetermined minimum threshold limit; and
   increasing a wheel axle load on the second rear wheel axle if the wheel axle load on the front wheel axle is below the predetermined threshold limit.

9. The method of claim 8, wherein an individually adjustable wheel axle suspension arrangement is connected between the first rear wheel axle and the vehicle chassis, wherein increasing the wheel axle load on the second rear wheel axle is executed by reducing a load pressure of the individually adjustable suspension arrangement of the first rear wheel axle.

10. The method of claim 9, wherein the individually adjustable suspension arrangement connected to the first rear wheel axle comprises a pneumatically controlled air bellows, wherein increasing the wheel axle load on the second wheel axle is executed by reducing an air pressure level of the pneumatically controlled air bellows.

11. The method of claim 8, wherein the first rear wheel axle is a liftable wheel axle, wherein increasing the wheel axle load on the second wheel axle is executed by lifting the first rear wheel axle.

12. The method of claim 1 wherein the steps are performed by a computer program contained on a computer readable medium and the program is run on a computer.

13. A system for controlling wheel axle suspension of a vehicle, the vehicle comprising a vehicle chassis, a prime mover for propulsion of the vehicle, the prime mover being connected to the vehicle chassis; and a front wheel axle comprising an individually adjustable wheel axle suspension arrangement on a respective left and right hand side of the front wheel axle as seen in the longitudinal direction of the vehicle, the individually adjustable wheel axle suspension arrangement being connected between the front wheel axle and the vehicle chassis; wherein the system comprises a control unit configured to control the system to:
   determine an output torque from the prime mover;
   determine a rotation of the vehicle chassis caused by the determined output torque from the prime mover;
   compare the rotation with a predetermined threshold limit; and
   control the individually adjustable wheel axle suspension arrangement on at least one of the left and right hand sides of the front wheel axle such that the rotation of the vehicle chassis is below the predetermined threshold limit.

14. A vehicle comprising:
   a vehicle chassis;

a prime mover for propulsion of the vehicle, the prime mover being connected to the vehicle chassis;

a front wheel axle comprising an individually adjustable wheel axle suspension arrangement on a respective left and right hand side of the front wheel axle as seen in the longitudinal direction of the vehicle, the individually adjustable wheel axle suspension arrangement being connected between the front wheel axle and the vehicle chassis; and a system for controlling wheel axle suspension of the vehicle, the system comprising a control unit configured to control the system to:

determine an output torque from the prime mover;

determine a rotation of the vehicle chassis caused by the determined output torque from the prime mover;

compare the rotation with a predetermined threshold limit; and control the individually adjustable wheel axle suspension arrangement on at least one of the left and right hand sides of the front wheel axle such that the rotation of the vehicle chassis is below the predetermined threshold limit.

\* \* \* \* \*